United States Patent
Schwerdtner et al.

(10) Patent No.: US 6,791,570 B1
(45) Date of Patent: Sep. 14, 2004

(54) METHOD AND DEVICE FOR THE THREE-DIMENSIONAL REPRESENTATION OF INFORMATION WITH VIEWER MOVEMENT COMPENSATION

(75) Inventors: Armin Schwerdtner, Dresden (DE); Holger Heidrich, Gaustritz (DE)

(73) Assignee: SeeReal Technologies GmbH (DE)

( * ) Notice: Subject to any disclaimer, the term of this patent is extended or adjusted under 35 U.S.C. 154(b) by 0 days.

(21) Appl. No.: 09/331,704

(22) PCT Filed: Dec. 15, 1997

(86) PCT No.: PCT/DE97/02910

§ 371 (c)(1),
(2), (4) Date: Aug. 30, 1999

(87) PCT Pub. No.: WO98/27451

PCT Pub. Date: Jun. 25, 1998

(30) Foreign Application Priority Data

Dec. 18, 1996 (DE) .......................... 196 52 689
Aug. 20, 1997 (DE) .......................... 197 36 035

(51) Int. Cl.[7] ............................................. H04N 13/00
(52) U.S. Cl. .......................... 345/613; 348/42; 348/51; 359/376; 359/462; 345/8; 345/9
(58) Field of Search ................. 345/8, 613; 348/42–60; 359/376–378, 458, 462–466

(56) References Cited

U.S. PATENT DOCUMENTS

| | | | | |
|---|---|---|---|---|
| 4,987,487 A | * | 1/1991 | Ichinose et al. | 348/42 |
| 5,606,455 A | * | 2/1997 | Eichenlaub | 359/462 |
| 5,774,262 A | * | 6/1998 | Schwerdtner et al. | 359/462 |
| 5,833,507 A | * | 11/1998 | Woodgate et al. | 445/24 |
| 5,929,859 A | * | 7/1999 | Meijers | 345/419 |
| 5,936,774 A | * | 8/1999 | Street | 359/619 |
| 5,991,073 A | * | 11/1999 | Woodgate et al. | 359/462 |
| 6,094,216 A | * | 7/2000 | Taniguchi et al. | 348/51 |
| 6,302,541 B1 | * | 10/2001 | Grossmann | 351/240 |

* cited by examiner

Primary Examiner—Matthew Luu
Assistant Examiner—Daniel Chung
(74) Attorney, Agent, or Firm—R W Becker & Associates; R W Becker

(57) ABSTRACT

The invention relates to an autostereoscopic method and a device for the three-dimensional representation of information according to a barrier-, lenticular-, prismatic mask-, or similar method using flat-panel displays (liquid crystal-, plasma-, electroluminescent- or other displays) for use in the computer and video technology, games and advertising, medical engineering, virtual reality applications, and other fields. According to the invention, the image points are proportionally tracked to lateral movement of the observer by shifting, for each colored subpixel, of the intensities of the colored subpixels to horizontally adjacent colored subpixels. The method can be used with known devices. It becomes especially useful when, for each image point, n+1 adjacent colored subpixels are addressed. Observers moving sideways continue to see the image in practically consistently high quality.

18 Claims, 9 Drawing Sheets

METHOD AND DEVICE FOR THE THREE-DIMENSIONAL REPRESENTATION OF INFORMATION WITH VIEWER MOVEMENT COMPENSATION

BACKGROUND OF THE INVENTION

The invention relates to an autostereoscopic method and a device for the three-dimensional representation of information according to a barrier-, lenticular-, prismatic masking-, or similar method using flat-panel displays (liquid crystal-, plasma-, electroluminescent- or other displays) for use in the computer and video technology, games and advertising, medical engineering, virtual reality applications, and other fields.

For the three-dimensional representation of information some autostereoscopic methods are already known, namely, among others, the barrier, lenticular, and prismatic masking methods (see, for example, S. Pastoor: 3D-Display-Technologie [3D display technology], Euroforum-Konferenz Display 1996, 17th and 18th Apr. 1996 in Nürtingen/Germany; D. Ezra et al.: Blick in die dritte Dimension [Looking into the third dimension]. In: Fernseh- und Kinotechnik, vol. 50, no. 3/1996, pp. 79–82; DE 296 12 054 U1; R. Börner: Autostereoscopic 3D-imaging by front and rear projection and on flat panel displays. In: Displays, vol. 14, no. 1, 1993, pp. 39–46; Autostereoscopic 3-D Image Display Device. In: IBM TDB, Vol. 37, no. 8, August 1994, pp. 463–465).

Using these methods, two images of a stereoscopic pair are simultaneously generated, one for the right eye and another for the left eye, and represented in a number of horizontally adjacent vertical columns, one image in columns for the right eye (in the following, right columns) and the other in columns for the left eye (in the following, left columns). The right columns and left columns alternately follow each other. Each two successive columns, one right and one left, form a pair of columns. From the two plain, fringe-like images of the pair the observer gains, due to his/her vision, a three-dimensional image impression.

The display by which the images of the pair are generated contains a number of pixels that are arranged as a matrix and vertically below each other compose the columns for the images. On usual direct-sight color displays each pixel technically consists of three colored subpixels for the three primaries red (R), green (G) and blue (B). On other displays the number of the colored subpixels is increased, for example, there is a second B-colored subpixel provided for each pixel. In a generalized mode, each pixel consists of n colored subpixels. By superpositioning the color contents of each n colored subpixels of the pixels image points develop on the display the raster of which corresponds to the matrix of the pixels. By each pixel column an image column is formed on the display from one of the two images of the pair. Each column has one image point per line. The colored subpixels are usually arranged in the pixels horizontally side by side, and repeat periodically on the lines, e.g. RGB, RGB, ... or BRGB, BRGB, .... Sequence and number n of the colored subpixels per period are determined by the design of the individual display. A color filter is assigned to each colored subpixel. Each colored subpixel is addressed corresponding with the appropriate value of intensity. The intensity values are given for each image by programming means.

The information in the right and left columns are assigned to the right and the left eye, respectively, using optical means, e.g. imaged in them. In the lenticular system each pair of columns is assigned a cylindrical lens. In the barrier method the columns are covered by line-shaped barriers such that the left eye can only see the left columns and the right eye can only see the right columns while the other columns are shaded in each case. In the prismatic masking method, prisms are arranged in front of the columns in a separation and a field lens mask, or in a combined separation/field lens mask respectively. The bundles of rays emerging from the right and left columns are horizontally separated using the prisms of the separation mask and spread by direction by about 6° corresponding with the spacing of the eyes whereby the right and left ray bundles each run parallel. The prisms of the field lens mask focus the right ray bundles onto the right eye and the left ray bundles onto the left eye. With both masks arranged behind each other, or with the combined separation/field lens mask respectively, two cones of light develop emerging from the display in the apeces of which the eyes of the observer are.

From this, observer positions ensue in that the right eye sees only the right columns and the left eye sees only the left columns. These observer positions repeat periodically when the observer moves laterally in front of the display. In these ideal observer positions the columns are assigned to the observer's eyes correct and in full width. For a small lateral displacement the match of columns and optical means reduces relative to the observer position. The right eye receives, for example, just 80% of the information of the right picture but 20% of the left. Cross-talk interference arises between the two image channels as soon as the observer moves. The stereo contrast reduces. The proportions of wrong information rise when the observer continues to move laterally until a total reverse of the information takes place, that is, information for the right eye is assigned to the left and vice versa. The observer sees a pseudoscopic picture. When the lateral movement is continued, the laterally correct information contents grow up reaching 100% correct assignment again.

Already known is to monitor the lateral position of the observer relative to the screen. For example, the position of the head and thus of the eyes relative to the screen can be determined using a commercial infrared camera (e.g., Dyna-Sight of Origin Instruments Corp., Grand Prairie, Tex., USA).

In the lenticular system the lens mask, and in the barrier method the barrier grating are mechanically followed. In other solutions the light of the light sources is laterally followed, or the screen is turned on a vertical axis. Generally, the pictures of the stereoscopic pair or the optical means to see the pictures, respectively, are followed to the lateral movement of the observer.

Also already known is the electronic switching of the picture information in those positions where the observer gains a pseudoscopic image.

The mechanical tracking devices require additional drive mechanisms, with an additional effort in manufacture, maintenance and space. Furthermore, they are relatively slow compared to electronic switching times. Problems increase with growing travel distance.

The electronic switching of the picture information can be carried out by programmes, that is, without any additional effort in hardware. The observer, however, must still remain in the ideal seating positions; only the number of them doubles. In the positions between the ideal ones, there is still cross-talk interference with resulting badly reduced image quality.

This is particularly significant with today's color displays. Between the ideal positions the observer sees, for example, instead of the red contents corresponding to the right image, the red contents corresponding to the left image and these form combined with the still correct green and blue color contents significantly disturbed stereo images. In this example, the stereo images for the green and blue color contents are correct. But as fas as the red color content is concerned, an inverse stereo image is obtained with the appropriate pseudoscopic effect.

The lenticular system amplifies this effect in a specific way. In order to cope with this, the display was turned by 90°. By this, the colored subpixels of each pixel are arranged below each other so that the original color values are proportionally maintained when the observer moves. This turn, however, requires a new design of the display.

It is the objective of the invention, when using a flat panel display whose pixels have n colored subpixels each arranged horizontally side by side and periodically following each other in a line, to track the images of a stereoscopic pair relative to lateral changes of the observer position such that the high stereoscopic image quality existing in the ideal observer positions is largely maintained.

SUMMARY OF THE INVENTION

According to the invention the problem is solved in that the image points are laterally shifted proportionally to the movement of the observer by shifting, for each colored subpixel, the intensities of the colored subpixels to colored subpixels horizontally adjacent on the display.

The method can be successfully realized, if in a first version, as already known, n colored subpixels per image point are available. The number of the ideal observer positions is raised to six per period of the ideal observer positions without image tracking. The stereoscopic crosstalk interference between the ideal positions is limited to a very low level by shifting the intensities, preferably for each colored subpixel in intermediate steps.

In another embodiment of this first version, a similar effect is achieved due to the fact that the programmed shifting, for each colored subpixel, of the image contents on the non-moving screen according to the invention is combined with the already known lateral shifting of the display or the light of the light sources or the optical means (e.g., of a barrier grating or of cylindrical lenses). Hereby the travel distance can be kept very small because the compensation must only include the full width of a colored subpixel. By this ideal image quality is achieved in each observer position. The method according to the invention becomes especially useful when, in a second version, n+1 adjacent colored subpixels per image point are addressed whereby the intensities of the two equally colored subpixels located at the borders of each image point are identical and preferably correspond to the intensity of this color in the image point, and the horizontal width of the visible part of an image point corresponds to n colored subpixel widths.

Considering a usual color display manufactured up to now, with n adjacent colored subpixels per pixel, the image points, or image columns, respectively, each are by one colored subpixel width wider than the pixels, or pixel columns, respectively.

In a preferable embodiment using a usual display with three colored subpixels in the colors RED (R), GREEN (G) and BLUE (B) periodically following each other in a line, for each image point four colored subpixels are addressed. On the display line the colored subpixels with the sequences RGBR, GBRG, BRGB, etc. form the image points.

In an ideal position in front of the screen the observer sees with the right and left eye, respectively, of the n+1 colored subpixels of each image point the two colored subpixels on the border of this image point half-width and the n−1 colored subpixels in between full-width. When laterally changing his/her position little, he/she sees of one of the two border subpixels a correspondingly smaller portion, e.g., only 20% of the colored subpixel width, but 80% of the width of the other border subpixel. As a sum, the intensity of the color content of the border subpixels is fully maintained. The observer continues to see a stereoscopically—as well as laterally—and color-correct stereo image.

With growing distance of the observer from the display, the color content of the border subpixels reduces. The reduction, however, is usually only a few percent so that the image impression hardly deteriorates.

Thus the arrangement according to the invention "tolerates" small lateral movements as well as greater changes of the distance of the observer from the display without noticeable worsening of the image quality.

On longer lateral movements of the observer the image points in the lines are, according to the invention, shifted by one or several colored subpixel widths and the intensity levels belonging to the image points, of the colors in the colored subpixels are assigned to the adjacent n+1 colored subpixels in the line, which are at the new position of the image point. The magnitude of the lateral shifting of the image points approximately corresponds to the lateral positional change of the observer. While the pixels and colored subpixels are bound to their positions on the display, the image points shift along the display line corresponding to the lateral movement of the observer. In conjunction with the "tolerance" of the system (theoretically, a displacement of one colored subpixel width maximum is allowed) the observer continues to see the image in practically consistently high quality. During the movement of the observer the same information can be shown. But the information can also change with lateral displacement of the observer. For example, the observer sees more of the right or of the left side of an object.

For an embodiment of the device preferably designed with a barrier grating the width of the bars of the barrier grating is greater than the width of the slits between the bars of the barrier grating, whereby the bars in the path of the rays to the eyes of the observer cover n+1 widths of colored subpixels and the slits between the bars are open for n widths of colored subpixels each.

It is shown by the subclaims and examples of embodiment that it is equally possible with the features according to the invention to build a prism or lenticular mask arrangement.

EXAMPLES OF EMBODIMENT

The invention is represented in the FIGS. 1 to 4 for the first version (n colored subpixels per image point), and in the remaining figures for the second version (n+1 colored subpixels per image point). For both versions, the different embodiments are first explained by an arrangement for a barrier method. The last two figures show the completely unproblematic transfer to arrangements for a lenticular or a prismatic masking method. Always by means of a horizontal section, the drawings show the intensity values at the colored subpixels for different observer positions:

DESCRIPTION OF THE PREFERRED EMBODIMENTS

First Version (n Colored Subpixels, FIGS. 1 to 4)

In the figures a detail of a display 1 and a barrier grating 2 as well as the right and left eye, 3r and 3l respectively, of an observer in an ideal position are shown. The lateral positional change a1 or a2, respectively, is monitored by a positional sensor. For this a DynaSight device is assigned to the display 1 and the target attached to the forehead of the observer. Device and target are not shown.

Figure 1:
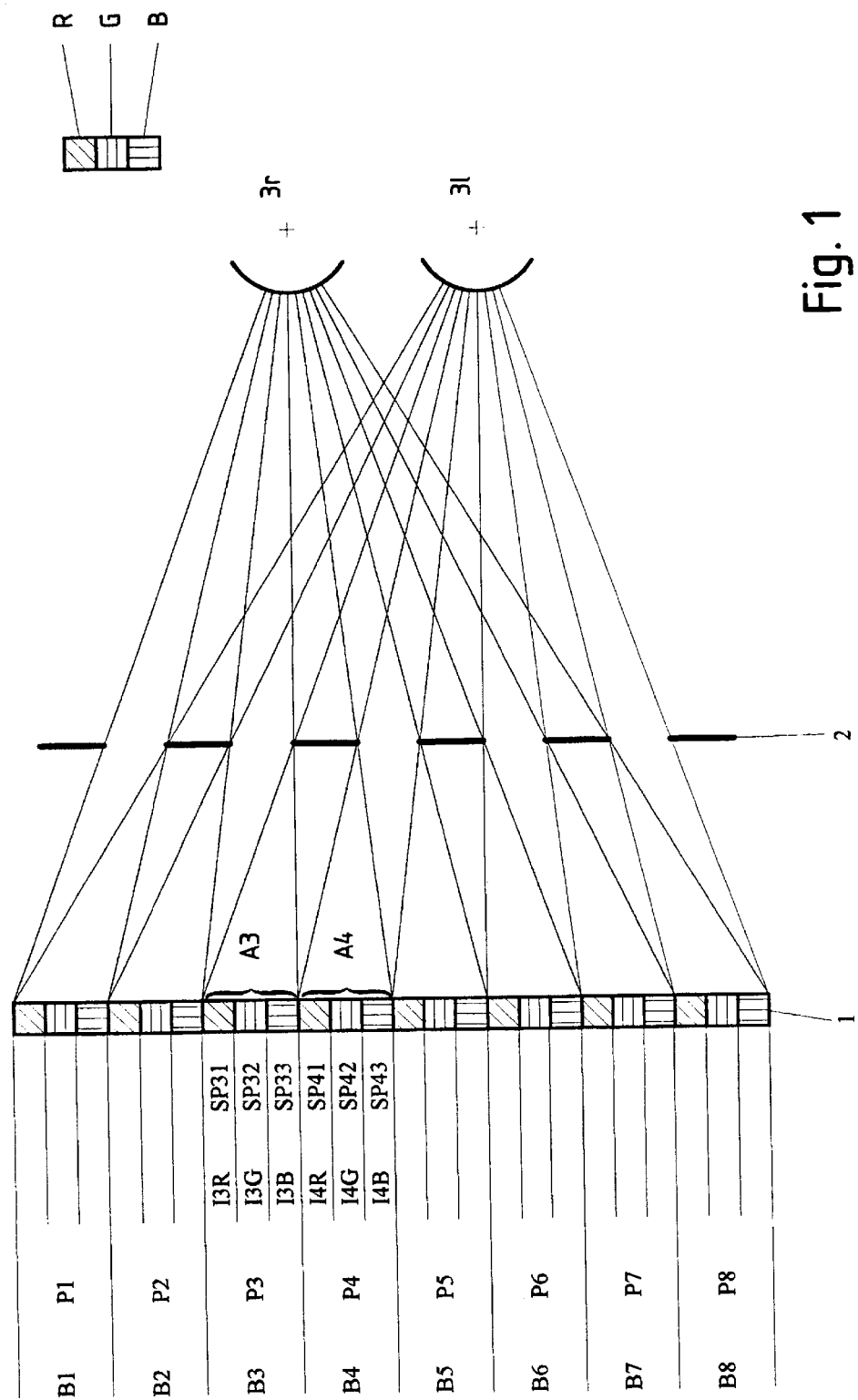
FIG. 1 the observer is in an ideal position in front of the display.

In the ideal position to FIG. 1, the observer sees the images of the stereoscopic pair completely and laterally correct. It is shown how the right eye 3r sees through the grating slits the pixels P1, P3, P5 and P7, and the left eye 3l sees the pixels P2, P4, P6 and P8 in full width. The odd-numbered pixels contain information of the right image, and the even-numbered pixels contain information of the left image. Vertically below each other, the odd-numbered pixels form the right, and the even-numbered pixels the left columns with the information of the right and left images, respectively. Each adjacent right and left columns form a pair of columns.

Each pixel consists of n=3 colored subpixels, namely the subpixels for the colors red R, green G and blue B, e.g. the pixel 3 consists of the colored subpixels SP31 (a red subpixel), SP32 (green) and SP 33 (blue). The intensity values of the colored subpixels can be adjusted electronically. The electronic means to do this are known and not shown in detail. By programme, this is done by defining the intensity values I for each colored subpixel, e.g. in image point B3: I3R at SP31, I3G at SP32, and I3B at SP33. The pixels P and the colored subpixels SP keep their positions on the display 1. The display 1, the pixels P and the barrier grating 2 do not change their positions. With a lateral movement the intensity values change. The right eye 3r sees through the barrier slit in section A3 all colored subpixels SP31 to SP33 of the pixel P3, and the left eye 3l sees through its barrier slit in section A4 all colored subpixels SP41 to SP43 of the pixel P4. The positions of the pixels P and image points B coincide. The observer gains a stereo image stereoscopically and color correct without cross-talk interference.

Figure 2:
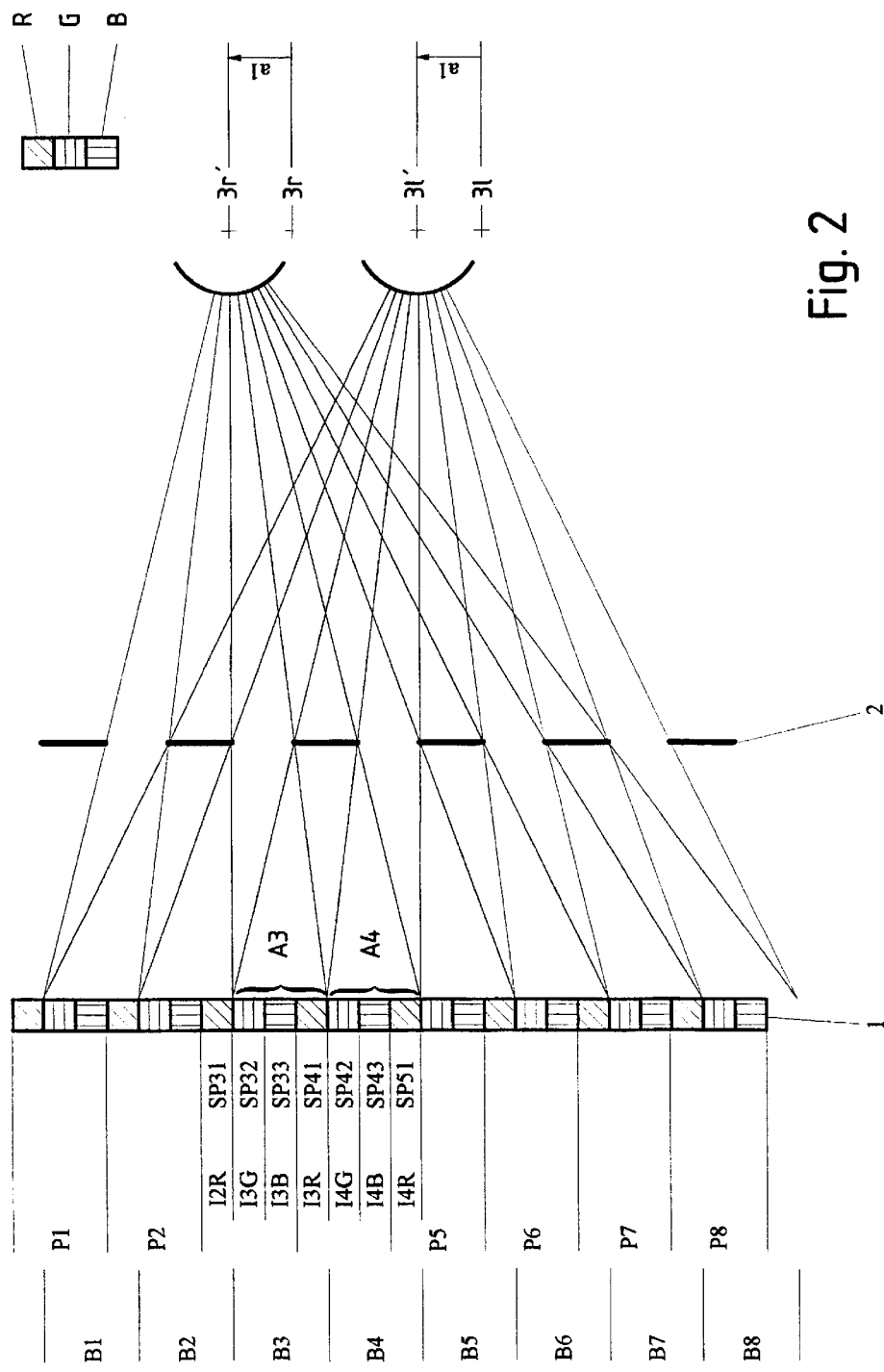
FIG. 2 the position of the observer changed laterally by a distance a1.

In FIG. 2 the observer has moved laterally relative to the display by the distance a1. The display 1 with all pixels and subpixels, and the barrier grating did not change their positions. The right eye 3r'(now sees in section A3 the colored subpixels SP32, SP33 and instead of SP31 the colored subpixel SP41, which is, according to FIG. 1, still given the intensity value I4R (an information of the left image). According to the invention, with the lateral movement al being determined the colored subpixel SP41 is given the intensity value I3R with the information of the right image, which before, in FIG. 1, was assigned to the colored subpixel SP31. Accordingly, the latter is given the intensity value I2R and the colored subpixel SP51 is given the intensity value I4R. The shift concerns the intensity values of all red subpixel columns, here by one pixel width to the left, from the observer's view. The image points B shifted by one colored subpixel width. They contain all the original information.

Although the observer in FIG. 2 is no more in an ideal position, he/her sees through the programme-controlled shifting of the intensity values of the red subpixels a stereo image that is stereoscopically and color correct.

Figure 3:
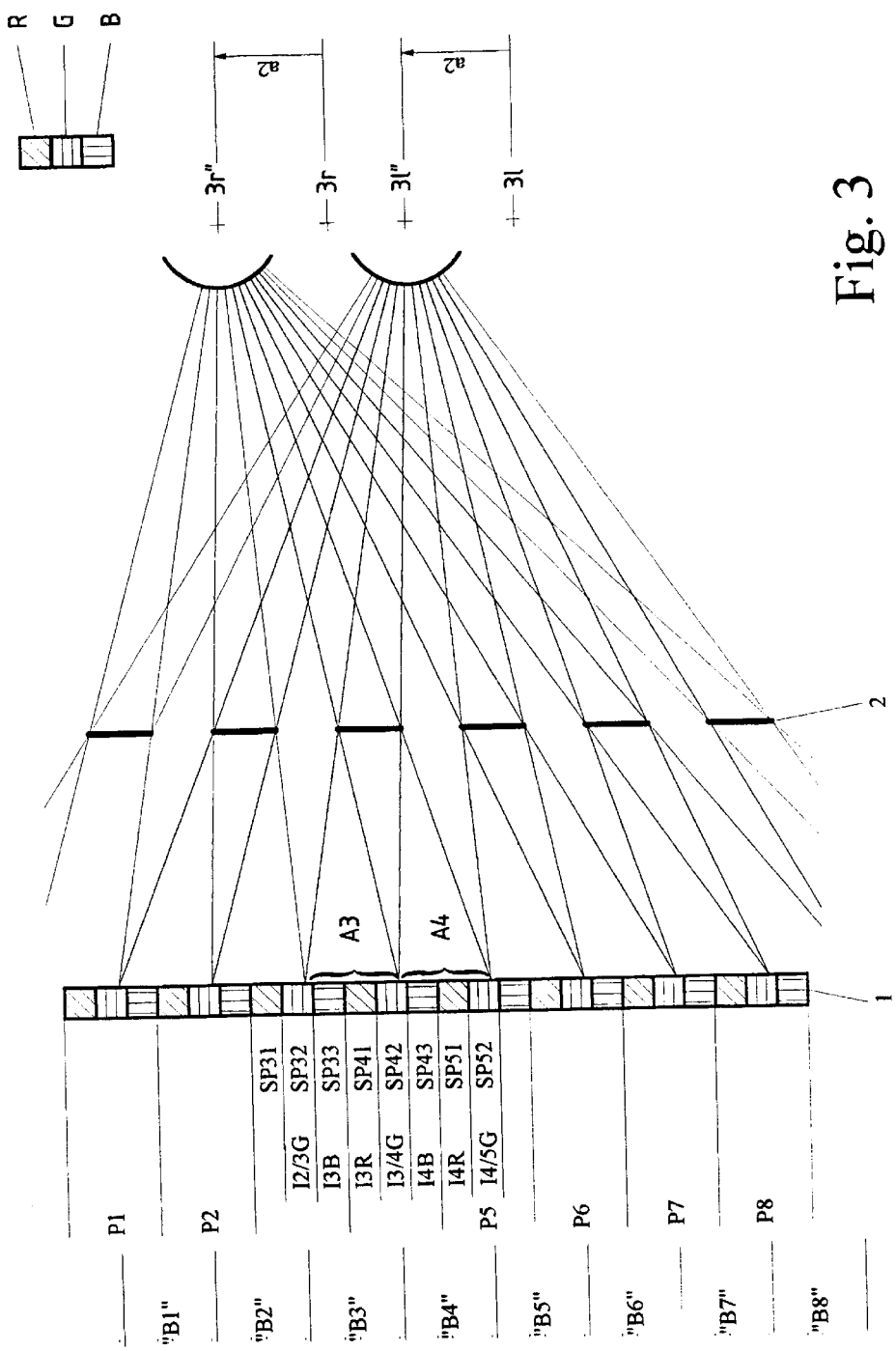
FIG. 3 the position of the observer changed laterally by a distance a2.

In FIG. 3 the observer has moved sideways relative to the display by the distance a2. The display 1 with all pixels and subpixels, and the barrier grating again did not change their positions. The right eye 3r" now sees in section A3 a part of the colored subpixel SP32, the colored subpixels SP33 and SP41 and a part of the colored subpixel SP42. To the colored subpixel SP41 the intensity I3R is applied (which had in FIG. 1 been at SP31). The two colored subpixels SP32 and SP42 at the border of section A3 are given the mixture intensities I2/3G and I3/4G, respectively. It is assumed in the example that SP32 is seen already 70% by the left eye and still 30% by the right eye. Accordingly, the intensity I2/3G consists of 70% of the intensity of I2G (in FIG. 1 at SP22) and 30% of I3G, i.e., in the ratio of the visible partial widths. The image points "B" have shifted by 1.7 colored subpixel widths compared to their position in FIG. 1. Because their information contents in the intermediate positions are not completely equal to the starting position in FIG. 1, they were written between quotation marks. But also in the intermediate positions a high image quality is achieved.

In another, simplified embodiment a mixture intensity of 50% to 50% for all bordering colored subpixels not completely visible by a single eye is pre-set. Here, the intensity of the colored subpixel SP32 would consist of 50% of the intensity of I2G and 50% of the intensity of I3G. By this, per period of ideal positions without image tracking, 12 ideal positions for the observer result.

Figure 4:
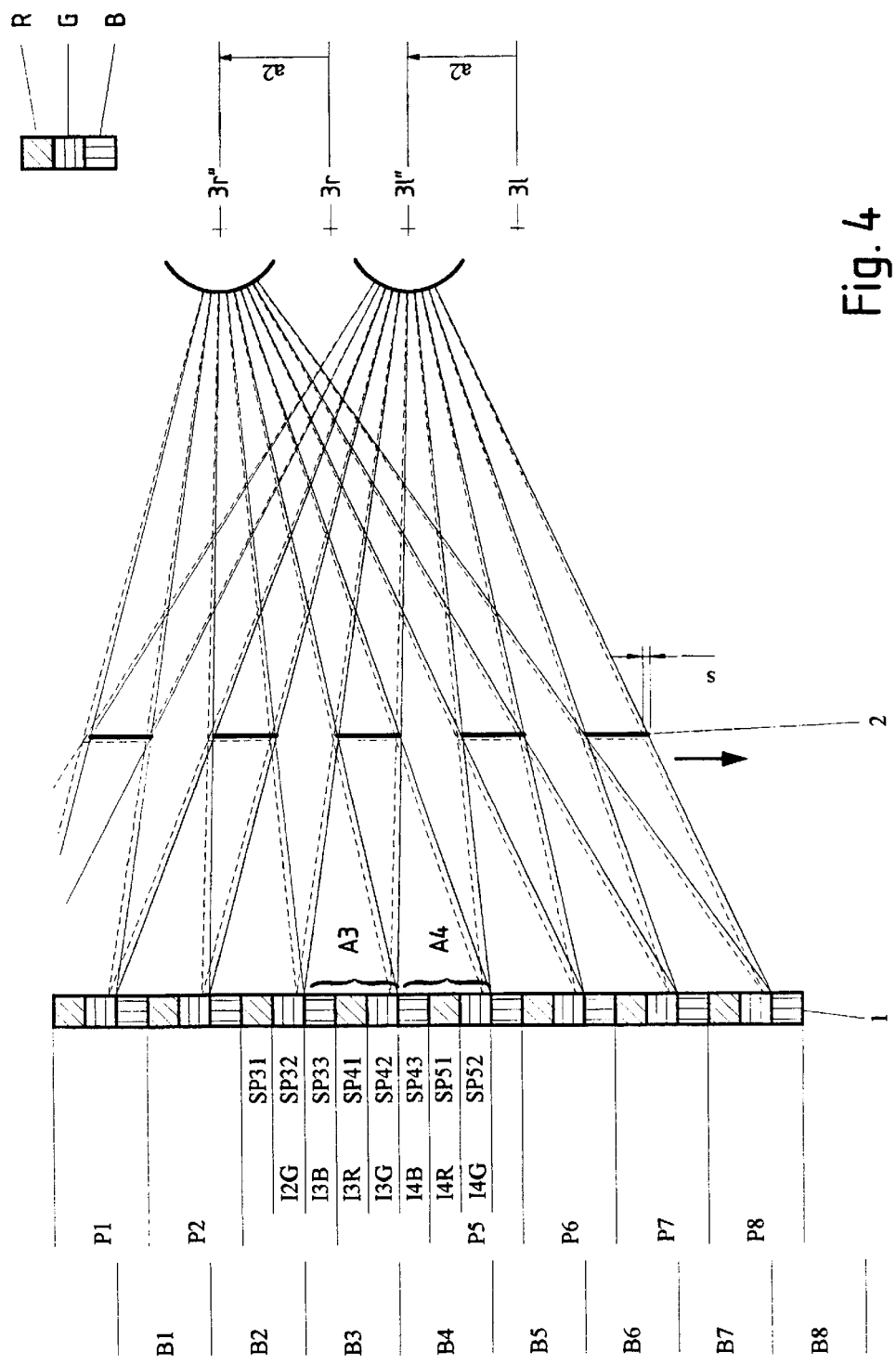
FIG. 4 the position of the observer changed laterally by the same distance a2 as in FIG. 3; in addition to the alteration of the intensity values the barrier grating is laterally shifted by the distance s.

FIG. 4 starts with the same lateral movement of the observer as in FIG. 3. The dashed lines correspond to the situation in FIG. 3. The right eye again sees without correction only 30% of SP32. Compared to FIG. 3, in addition to the programme-controlled shifting of the intensity values a lateral mechanical adjustment of the barrier grating 2 is carried out by the distance s in the direction given by the arrow. The new positions of the barrier grating and of the sections are shown by solid lines. The distance s is chosen such that the left eye sees the colored subpixel SP32 in its full width. Taking the intercept theorems into account the distance s corresponds to the compensation for the full width of the colored subpixel, or to the partial width of the colored subpixel SP32 no more visible. The intensity values are changed by programme as in FIG. 2. The image points has been shifted by two colored subpixel widths. If the lateral movements can be realized accurately, the ideal image quality is always obtained for all observer positions.

The barrier grating would also have been shifted into the other direction, opposite to the arrow shown, so that the right eye sees the colored subpixel SP32.

In the example, small changes of the lateral movement were assumed in order to clarify the changes. It goes without saying that the shifting of the intensity values I over several horizontally adjacent pixels can be executed proportional to longer lateral movements of the observer. Hereby, e.g., there would not be I2R at SP31 in FIG. 2, but I(2+k)R with k as a greater number of pixels.

The changes according to the invention shown for the barrier method can be transferred to the lenticular system and similar systems and methods.

Second version (n+1 colored subpixels per image point, FIGS. 5 to 11) The examples are explained for a display 1 at which three subpixels SP with the colors RED (R), GREEN (G) and BLUE (B) are neighboring in a line and periodically follow each other. According to the invention, the image points B are no more formed of n=3, but n+1, i.e. 4 colored subpixels SP.

Figure 5:
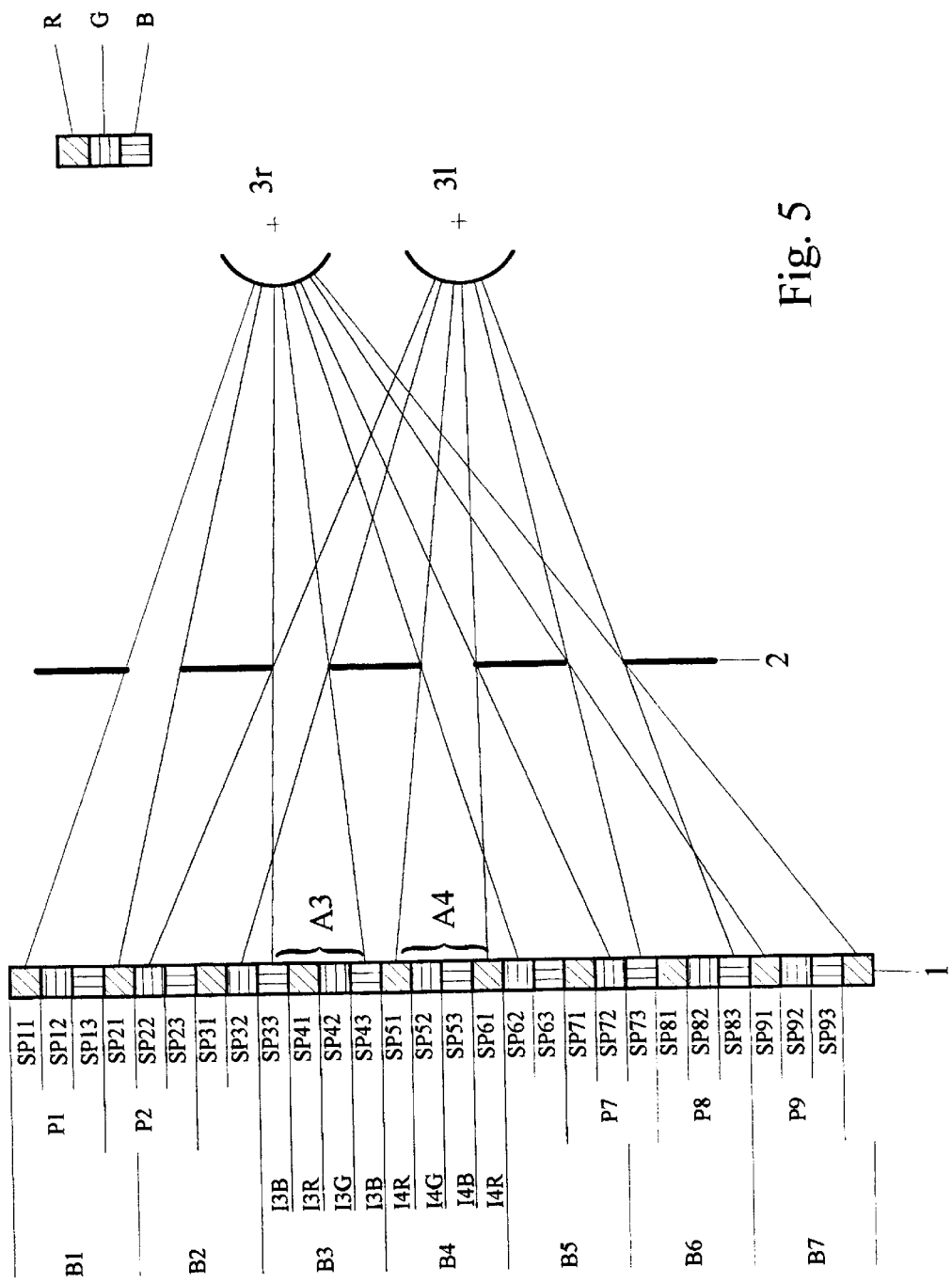
FIG. 5 the observer is in an ideal position in front of the display.

On the display 1 the pixels P are again arranged as a matrix. In the shown line sections of the display 1 they are successively designated, as in the FIGS. 1 to 4, with P1, P2, etc. The appropriate colored subpixels SP are also numbered in triple groups, e.g. the colored subpixels SP of the pixel P4 by SP41, SP42 and SP43. This numbering defines the location of the colored subpixel SP on the display line. In all figures the SP41 is at the same place of the considered line of display 1. In the example, the SP41 again is a R-colored subpixel. The intensity I of the red color is pre-set according to the image point by programming means. In FIG. 5, the colored subpixel SP41 belongs to the image point B3 and has the intensity value I3R (I for intensity, 3 for the image point B3, and R for the R-colored subpixel). The detail A3 is, in FIG. 5, that part of the image point B3 visible for the right eye 3r of the observer. Accordingly, A4 is that part of the image point B4 visible for the left eye 3l of the observer. Each image point includes four colored subpixels SP. In FIG. 5, the image point B3 is formed of the colored subpixels SP33, SP41, SP42 and SP43. As shown in the further figures, the assignment of the image points B to the colored subpixels SP is not fixed. The image point B can be shifted along the line. The assignment of the image point B to the four colored subpixels SP in its new position on the line is according to its displacement.

In the FIGS. 5 to 9 a barrier grating 2 is arranged in front of the display 1. The width of its bars is greater than the width of the slits between the bars. For either eye 3 of the observer viewing of 3 colored subpixels widths is free while in between always four colored subpixels widths are shaded. In FIG. 5, in the details A3 and A4, the colored subpixels SP33 and SP43, or SP51 and SP61 respectively, located on the border of the image points B3 and B4 are seen half each, and the colored subpixels SP41 and SP 42, or SP52 and SP53 respectively, located in between are seen in full width.

The observer looks through the barrier slit with his/her right eye 3r at the image points B1, B3, B5 and B7, and with his/her left eye 3l at the image points B2, B4 and B6. The odd-numbered image points contain information of the right picture and the even-numbered image points contain information of the left picture. Vertically below each other, the odd-numbered image points form the right columns, the even-numbered image points form the left columns with the information of the right and left pictures respectively. Each adjacent right and left columns form a pair of columns.

In the embodiment of FIG. 5 equal intensity values I are assigned to the colored subpixels bordering an image point, e.g., I3B for the blue color portion in image point B3 and I4R for the red color portion in image point B4. The intensity values I are identical in each case, and correspond each to the intensity value I of this color in the image point B as if the color of the image point B, as applying up to here, were formed of only three colored subpixels. Because the bordering colored subpixels each are seen only half, the details A3 and A4 as a sum of the visible parts of all respective four colored subpixels SP contain the correct blue or red color content.

Figure 6:
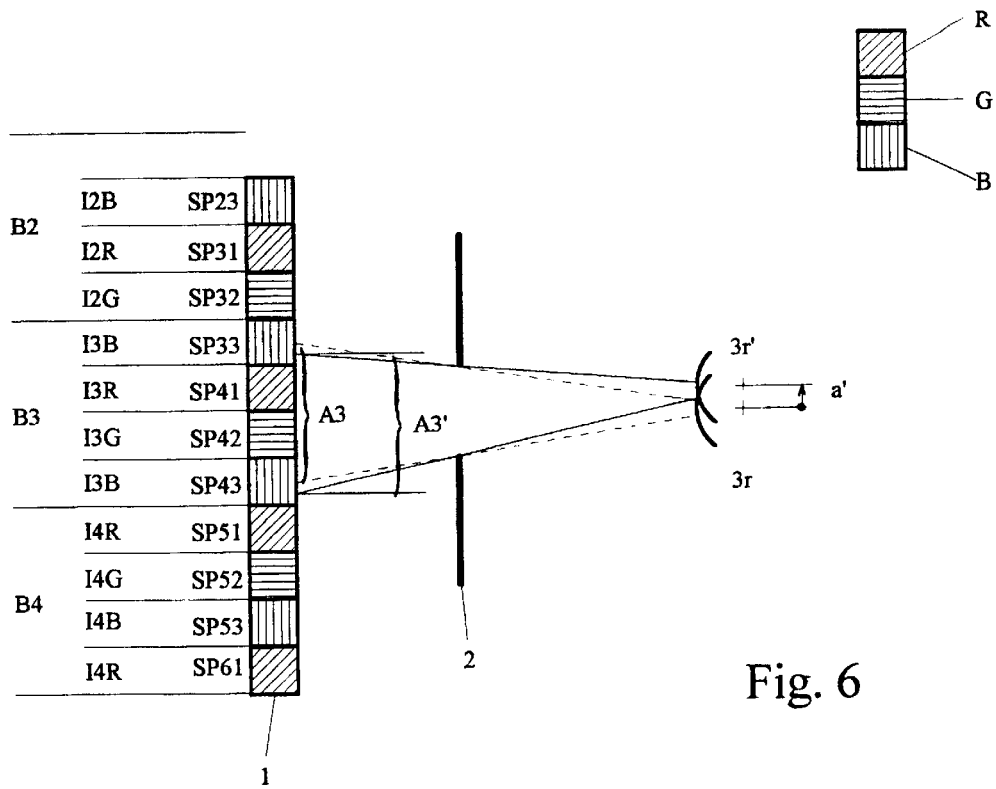
FIG. 6 the position of the observer changed laterally by the distance a'.

An advantage of this embodiment can be seen from the FIGS. 6 to 9. In FIG. 6 the observer has changed its position laterally by a small distance a'(compared to the position in FIG. 5 (dashed lines). In the new position 3r'(the right eye sees the section A3'((solid lines). It sees the colored subpixels SP41 and SP43 in full width as up to here, of SP33 only about 25%, and of SP43 about 75%. Summed up, again 100% of the blue color content given by the intensity value I3B is seen. The observer can move ⅛ of the eye distance to the right or left without the image quality changing.

Figure 9:
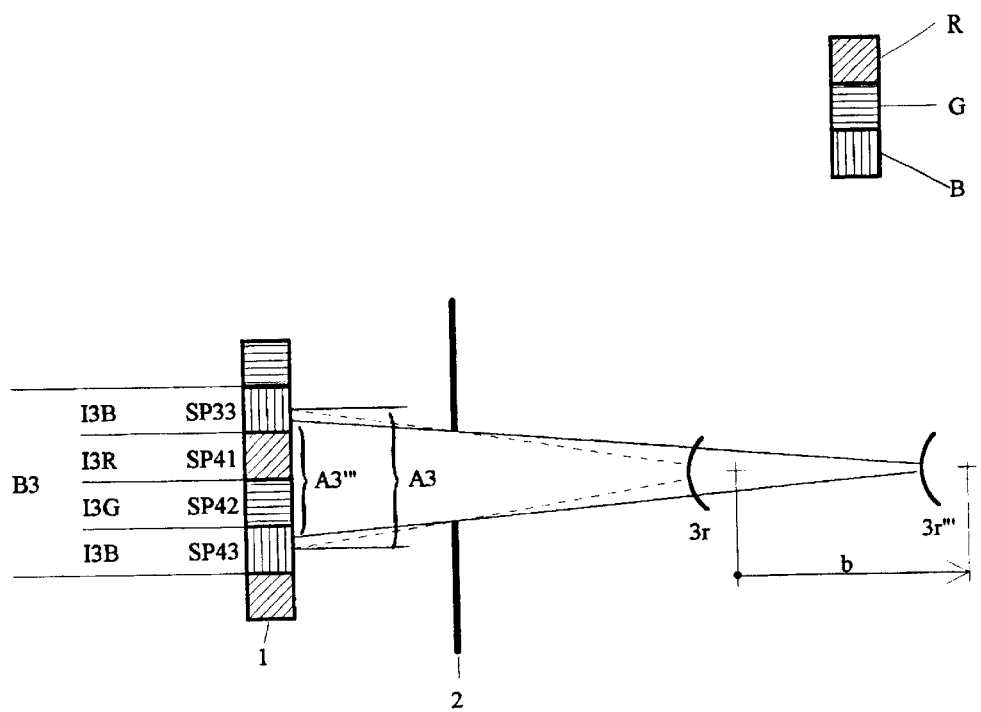
FIG. 9 the distance of the observer from the display has changed by the distance b.

In FIG. 9, the observer has moved away from the display by the distance b. Again the image point 3, or section A3 of FIG. 1, is shown for the right eye of the observer. In the new position 3r'''((the section A3'''((is seen, which is smaller than A3. This means that the summed color content of the border colored subpixels SP33 and SP43 is smaller than 100%. This could be compensated for by changing the intensity value I3B. In practice, for the standard embodiments, the width proportion of the border colored subpixels reduces in the image section by few percent only so that the observer continues to see an image of almost the same quality.

The FIGS. 6 and 9 show the "tolerance" of the system against small lateral movements and greater changes of the distance of the observer from the display.

Figure 7:
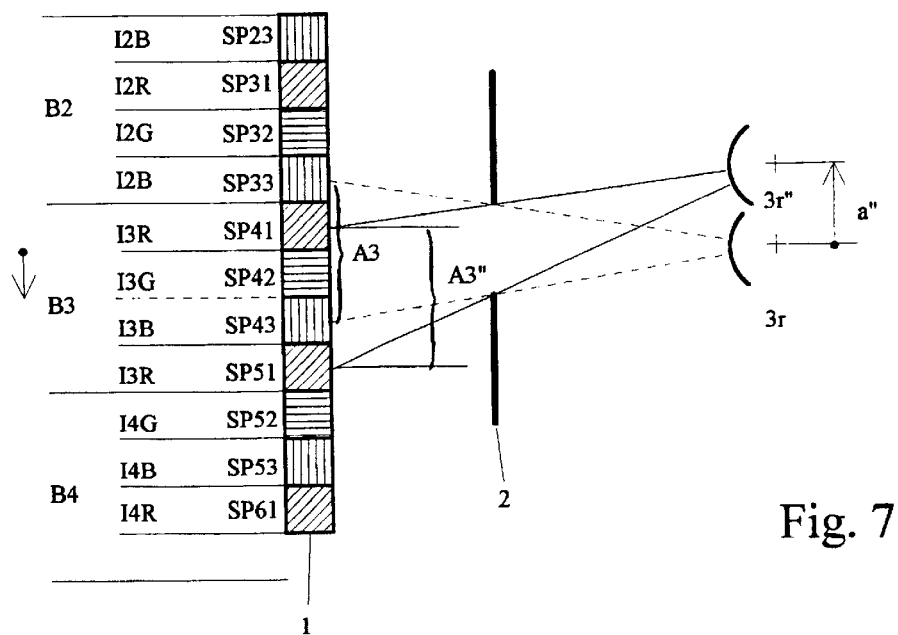
FIG. 7 the position of the observer changed laterally by the distance a(.

In FIG. 7 the observer has moved laterally relative to the display by the distance a"(in the direction given by the arrow (in direction to the upper border of the drawing). In position 3r"(the right eye now sees in section A3"(the colored subpixels SP41, SP42, SP43 and SP51. Without the intensity values being altered, SP51 would have a wrong intensity value in the image point B3. By the method according to the invention, with the determination of the lateral movement a"((e.g., by head finding) the intensity values for each color are assigned to the adjacent colored subpixels of the corresponding color while their assignment to the image points is maintained. To the two border subpixels now red in image section A3"(, the intensity value I3R is assigned. SP42 is given the intensity value I3G, and SP43 is given the intensity value I3B. While the pixels P and the colored subpixels SP remained in their positions in the display line, the image point B3 was shifted by a colored subpixel width in the direction given by the arrow (in direction to the lower border of the drawing) and assigned to the four colored subpixels located in the new position.

Figure 8:
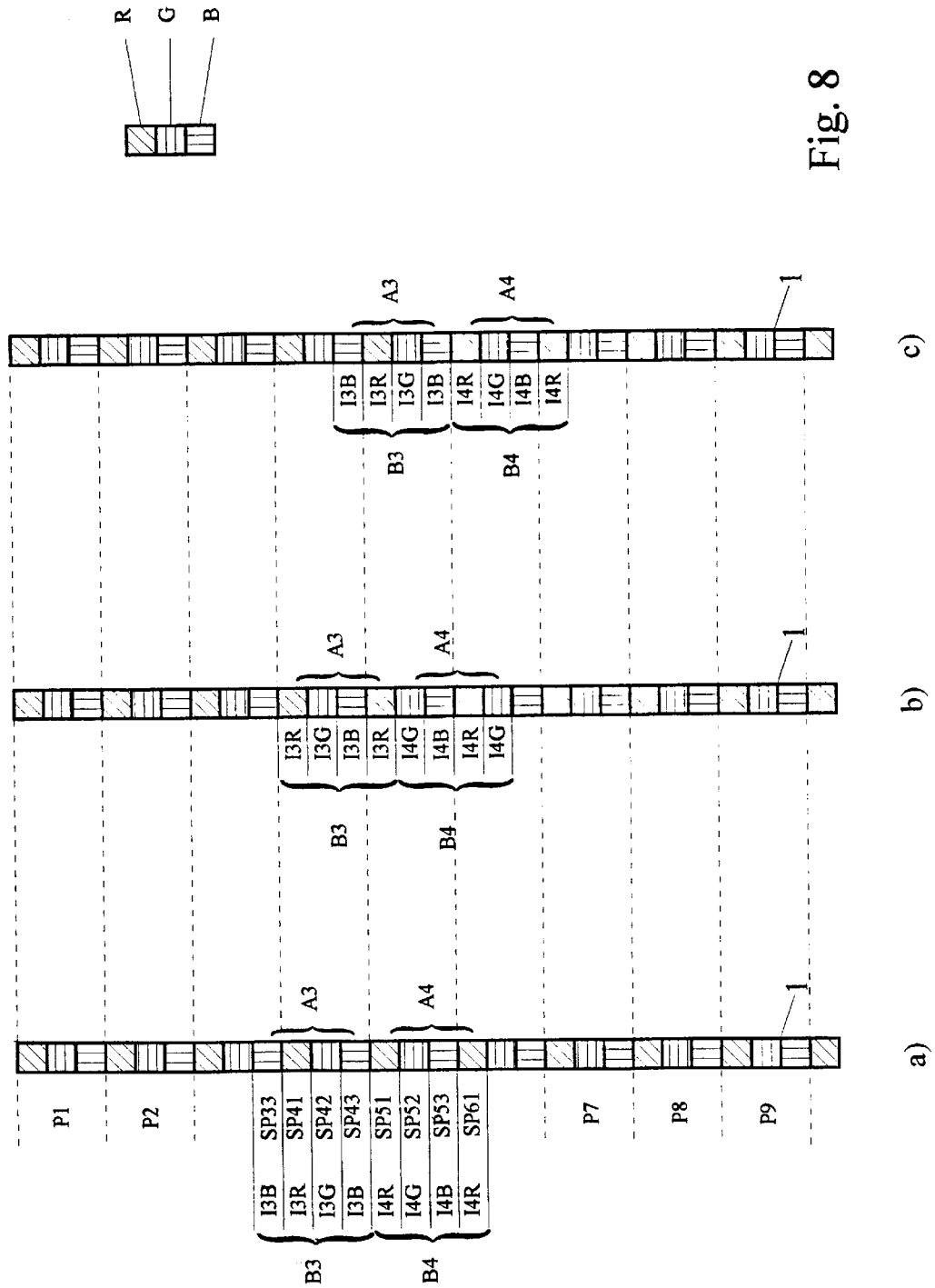
FIG. 8 the observer is in three different lateral positions.

In FIG. 8 the shifting of the image points B to the pixels P, or the assignment of the intensity values I to the colored subpixels SP respectively, in three steps is shown. In FIG. 8a, the observer has a position according to FIG. 5. The position of the observer in FIG. 8b corresponds to that according to FIG. 7. In FIG. 8c, the observer has laterally moved even further. While the colored subpixels SP and pixel P keep (as in the display) their positions, the assignment of the intensity values I to the colored subpixels SP according to the shifting of the image points changes whereby the information content of the image sections A remains unchanged.

The lateral shift of the information content occurs simultaneously for the entire display so that the observer sees the same image despite of his/her lateral movement. The particular advantage of the solution consists in that the shifting can be carried out step by step according to the width of the colored subpixels SP and, nevertheless, the image is continuously seen.

Although the observer in FIGS. 7, or 8b or 8c, respectively, is no more in the position of FIG. 5, due to the programme-controlled shifting of the assignment of the intensity values I to the colored subpixels SP he/her sees a stereoscopically and laterally correct stereo image. It is as if he/her maintained his/her ideal position of FIG. 5.

Figure 10:
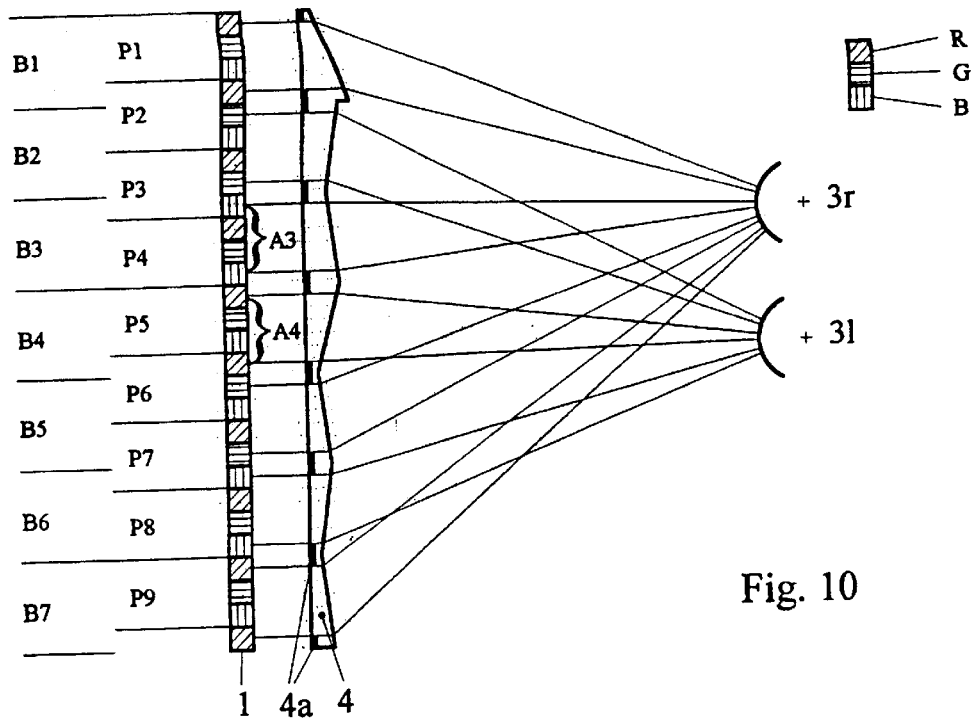
FIG. 10 an arrangement with prismatic mask; the observer is in an ideal position in front of the display.

In FIG. 10 a prism mask 4 is arranged in front of display 1. It spreads the ray bundles to the interpupillary distance and focuses them into the eyes 3r and 3l. The width of the prisms of the prism mask 4 is equivalent to the width of four colored subpixels. At the side of the prism mask 4 facing the display 1 there is a dimming grating with vertical bars 4a. The width of the bars 4a is equivalent to a colored subpixel width. The bars 4a cover half a colored subpixel width on each border, that is, the prisms are transparent to light in their centres for the width of three colored subpixels, and not transparent on the borders.

Figure 11:
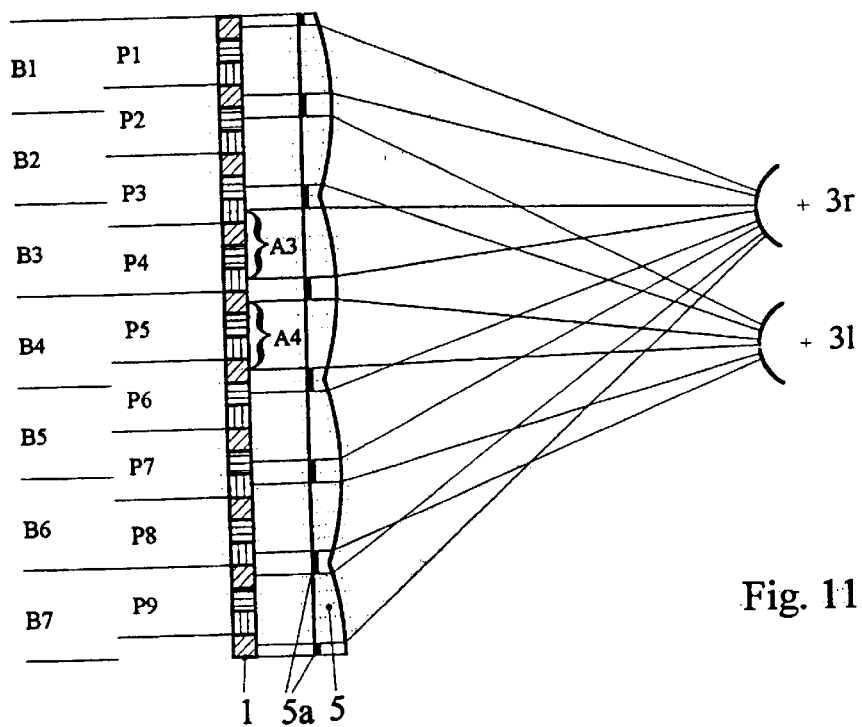
FIG. 11 an arrangement with lenticular mask; the observer is in an ideal position in front of the display.

In FIG. 11 a lenticular mask 5 is arranged in front of display 1. It spreads the ray bundles to the interpupillary distance and focuses them into the eyes 3r and 3l. The width of the cylindrical lenses of the lenticular mask 5 is equivalent to the width of eight colored subpixels. At the side of the lenticular mask 5 facing the display 1 there is a dimming grating with vertical bars 5a. The width of the bars 5a is equivalent to a colored subpixel width. The bars 5a cover half a colored subpixel width on each border and a colored subpixel width in the centre of each lens.

In the two examples, the dimming gratings are integrated in the prism mask 4 or lenticular mask 5, respectively.

The specification incorporates by reference the disclosure of German priority documents 196 52 689.2 of 18 Dec. 1996, 197 36 035.1 of 20 Aug. 1997, as well as of International Application PCT/DE97/02910 of 15 Dec. 1997.

The present invention is, of course, in no way restricted to the specific disclosure of the specification and drawings, but also encompasses any modifications within the scope of the appended claims.

What is claimed is:

1. A method for the three-dimensional representation of information, comprising the steps of:
    generating a flat-panel display having a plurality of pixels, each said pixel comprising n colored subpixels horizontally adjacent and periodically succeeding in a line to form two pictures of a stereoscopic pair, one said picture for the right eye of an observer and one said picture for the left eye of an observer, wherein said subpixels form adjacent, alternately succeeding right and left columns having one image point each per line;
    providing optical means;
    assigning each said column to the right or left eye, respectively, of the observer with said optical means;
    measuring the lateral angle of eye position of the observer to said display;
    tracking said pictures in said pair to a lateral change of position of the observer;
    laterally shifting said image points and said columns to accommodate said lateral change of position of the observer by shifting intensities of each said colored subpixel to a horizontally adjacent colored subpixel on the display, wherein said lateral shifting is approximately proportional to said lateral change of position of said observer.

2. The method according to claim 1, wherein the respective intensities of the colored subpixels are shifted for each colored subpixel in intermediate steps, whereby the intensity of each said colored subpixel contains a proportion of the intensity corresponding to information for the right eye and a proportion of the intensity corresponding to information for the left eye.

3. The method according to claim 2, wherein the respective intensities of the colored subpixels comprise intensity proportions that correspond to portions of a width of the colored subpixel seen by the right or left eye, respectively.

4. The method according to claim 2, wherein the respective intensities of the colored subpixels are formed independently of a partial width proportion of 50% each of the intensities of left and right colored subpixels.

5. The method according to claim 2, wherein the lateral shifting corresponding to the lateral change of position of the observer, comprises an electronic shifting of intensity values of each colored subpixel, over one or several horizontally adjacent pixels and a mechanical lateral shifting of the display or of the optical means by a distance that corresponds either to a partial width visible without lateral shifting on the border of a section (A) of a colored subpixel or to the compensation of the partial width of a full colored subpixel width.

6. The method according to claim 1, wherein n+1 adjacent colored subpixels are addressed per image point, whereby the intensities of two subpixels having the same color on a border of an image point are identical.

7. The method according to claim 6, wherein the intensities of the two subpixels having the same color bordering an image point correspond to the intensity of the same color in the image point.

8. The method according to claim 6, wherein the intensities of the two subpixels having the same color boring an image point are increased with growing distance of the observer from the display.

9. The method according to claim 1, wherein the shifting of the intensities of each colored subpixel is performed by programming means.

10. A device for the three-dimensional representation of information, comprising:
    a flat-panel display having a plurality of pixels, each said pixel comprising n colored subpixels having color contents horizontally adjacent and periodically succeeding in a line to generate two simultaneously produced pictures of a stereoscopic pair, one of said pictures for the right eye and one of said pictures for the left eye of an observer, said pictures resolved in a number of adjacent, alternately succeeding right and left columns having one image point each per line;
    optical means arranged in front of said display for assigning the columns to the right or left eye, respectively, of the observer;
    wherein each said image point comprises the color contents of an n+1 adjacent colored subpixel, and wherein the horizontal width of a part visible by said optical means of one of said image points corresponds to n colored subpixel widths.

11. The device according to claim 10, wherein said display has three colored subpixels periodically succeeding in a line for the colors red (R), green (G) and blue (B), wherein each image point consists of four succeeding colored subpixels.

12. The device according to claim 11, wherein in a display line, the colored subpixels forming the image points succeed each other in the repeating sequence RGBR, GBRG, BRGB.

13. The device according to claim 10, further comprising a barrier grating having a plurality of bars positioned in front of the display with a plurality of slots defined by said bars, wherein the width of said bars is greater than the width of said slots.

14. The device according to claim 13, wherein each bar is n+1 colored subpixel widths wide and wherein each slit between the bars is n colored subpixel widths wide.

15. The device according to claim 10, further comprising at least one prism mask positioned in front of the display, wherein the width of the at least on prism mask corresponds to n+1 colored subpixel widths.

16. The device according to claim 15, further comprising a dimming grid having vertical grid bars for said prism mask, whereby the width of each grid bar covering a center area of the prism mask corresponds to the width of one of said colored subpixels and the width of each grid bar on a border of said at least one prism corresponds to one-half the width of a colored subpixel.

17. The device according to claim 10, further comprising a lenticular mask arranged in front of the display and having a cylindrical lens, wherein the width of the cylindrical lens corresponds to 2(n+1) colored subpixel widths.

18. The device according to claim 17, further comprising a dimming grid having vertical grid bars for said lenticular mask, wherein the width of each grid bar covering a center region of the lens corresponds to the width of a colored subpixel and wherein the width of each grid bar covering a border of said lens corresponds to one-half the width of a colored subpixel.

* * * * *